United States Patent [19]

Komatsu et al.

[11] Patent Number: 4,795,241

[45] Date of Patent: Jan. 3, 1989

[54] DEVICE AND METHOD FOR PROVIDING OPTICAL BISTABILITY WITH FREE CARRIER RECOMBINATION CENTERS INTRODUCED INTO AN OPTICAL GUIDE SURROUNDING SEMICONDUCTOR LAYER PORTION

[75] Inventors: Keiro Komatsu; Masahiko Fujiwara, both of Tokyo, Japan

[73] Assignee: NEC Corporation, Tokyo, Japan

[21] Appl. No.: 125,083

[22] Filed: Nov. 25, 1987

[30] Foreign Application Priority Data

Nov. 25, 1986 [JP] Japan .................................. 61-280988

[51] Int. Cl.$^4$ ............................................. G02B 5/23
[52] U.S. Cl. ...................................... 350/354; 437/24
[58] Field of Search ............................ 350/354; 357/4; 437/20-25

[56] References Cited

PUBLICATIONS

"All-Optical GaAs Chip: Bistable at Room Temperature", Electro-Optical Systems Design, May 1982, p. 12.
Y. Silberberg & P. Smith, "Fast Nonlinear Optical Response from Proton-Bombarded Multiple Quantum Well Structures", Appl. Phys. Lett. 46(8), 15 Apr. 1985, pp. 701-703.

Primary Examiner—Eugene R. LaRoche
Assistant Examiner—Nathan W. McCutcheon
Attorney, Agent, or Firm—Sughrue, Mion, Zinn, Macpeak & Seas

[57] ABSTRACT

In a semiconductor layer which has in a semiconductor bistable etalon a refractive index variable, as a result of absorption by excitons, with the intensity of an optical beam incident thereon, an optical guide for the optical beam is surrounded by a cladding portion including atoms which reduce the refractive index in the cladding portion relative to the optical guide and serve as recombination centers for free carries produced by decomposition of the excitons. The semiconductor layer may be either a superlattice layer, such as a GaAs-GaAlAs layer, or a bulk semiconductor layer, such as a GaAs layer. After forming the semiconductor layer on an etch-stop layer which is formed on a semiconductor substrate for chemical etch of the substrate for a window, the atoms are injected into the surrounding portion as by bombarding an exposed surface of the semiconductor layer by hydrogen ions with a mask selectively formed on the exposed area to cover an area contiguous on the exposed surface to a columnar portion which becomes the optical guide. The hydrogen ions automatically become the atoms of the above-described type in the surrounding portion.

6 Claims, 3 Drawing Sheets

DEVICE AND METHOD FOR PROVIDING OPTICAL BISTABILITY WITH FREE CARRIER RECOMBINATION CENTERS INTRODUCED INTO AN OPTICAL GUIDE SURROUNDING SEMICONDUCTOR LAYER PORTION

BACKGROUND OF THE INVENTION:

This invention relates to an optical bistable element comprising, between a pair of reflecting films operable as an etalon for an optical beam propagated between the reflecting films, a semiconductor layer having a refractive index variable with an intensity of the optical beam as a result of absorption by excitons. This invention relates also to a method of manufacturing such an optical bistable element.

An optical bistable element of the type described, will herein be referred to briefly as a semiconductor bistable etalon because the reflecting films serve like the known partially silvered glass plates of a conventional etalon. Such semiconductor bistable etalons are already known. Having optical switching and optical memory capabilities, the semiconductor bistable etalon is believed to be an important element in optical communication networks and optical information processing systems.

Semiconductor bistable etalons, such as a semiconductor superlattice etalon and a bulk semiconductor etalon, and a method of manufacturing a semiconductor superlattice etalon are described in a letter contributed by H. M. Gibbs et al to Applied Physics Letters, Volume 43, No. 3 (1 Aug. 1982), pages 221 to 222, under the title of "Room-temperature Excitonic Optical Bistability in a GaAs-GaAlAs Superlattice Etalon." According to the Gibbs et al letter, the semiconductor superlattice etalon comprises a GaAs-GaAlAs superlattice layer between a pair of dielectric coatings which serve as a pair of reflecting films of the etalon. The superlattice layer comprises sixty-one periods, each consisting of a 336-Å GaAs layer and a 401-Å $Ga_{0.73}Al_{0.27}As$ layer, and has saturated exciton absorption in a multiple quantum well at room temperature.

When directed to one of the dielectric coatings, an incident optical beam is propagated through the superlattice layer as a propagated optical beam. If the incident optical beam has a certain input intensity or power, the propagated optical beam comes out of the etalon through the other dielectric coating as an excit or transmitted optical beam of an appreciable output intensity.

For an incident optical beam of a variable input intensity, the etalon shows excitonic optical bistability, namely, a refractive index response or characteristic which varies with the input intensity as a result of absorption of the propagated beam by excitons generated by the propagated beam. More particularly, the etalon shows a hysteresis loop in an input intensity versus output intensity characteristic. Incidentally, a columnar portion of such a semiconductor layer serves as an optical guide for the propagated optical beam.

According to Gibbs et al, the semiconductor superlattice etalon was manufactured as follows by molecular beam epitaxy (MBE). A layer of GaAs was grown on a silicon-doped GaAs substrate with an etch-stop layer of $Ga_{0.73}Al_{0.27}As$ added. Sixty-one periods were grown with each GaAs layer followed by a $Ga_{0.73}Al_{0.27}As$ layer. After polished down to less than 100 microns, the substrate was selectively etched for provision of a window which was 2 mm in diameter. Subsequently, dielectric coatings were evaporated on both surfaces to increase the reflectivity to nearly 90°/o between 820 and 890 nm.

The semiconductor superlattice etalon of Gibbs et al has a large refractive index nonlinearity at room temperature, is compatible with wavelengths of the present-day semiconductor laser diodes, and is adapted to high-density integration. Moreover, the etalon is operable at a high switch-on speed. However, the etalon has a low switch-off speed.

Semiconductor bistable etalons and a method of manufacturing a semiconductor superlattice etalon are described also in a letter contributed by Y. Silberberg et al to Applied Physics Letters, Volume 46, No. 8 (15 Apr. 1985), pages 701 to 703, under the title of "Fast Nonlinear Optical Response from Proton-bombarded Multiple Quantum Well Structures." It is known prior to the Silberberg et al letter that the switch-on speed is governed by an energy relaxation time for the excitons (between generation of the excitons by the propagated optical beam and decomposition by optical phonons of the excitons into electron and hole pairs) and is very short (one picosecond or shorter) and that the switch-off speed is governed by a recovery time of free carriers produced by decomposition of the excitons and is considerably long (a few scores of nanoseconds, such as 30 nanoseconds, in the case of natural recombination).

According to Siberberg et al, a semiconductor superlattice etalon comprises a superlattice layer which consists of eighty periods of 102-Å GaAs layers alternated with 101-Å $Ga_{0.71}Al_{0.29}As$ layers grown by molecular beam epitaxy on an etch-stop layer of $Ga_{0.71}Al_{0.29}As$ on a GaAs substrate. Such superlattice layers were bombarded with different doses of 200-keV hydrogen ions (protons). After the superlattice layers on the respective substrates were annealed for ten minutes at 300° C., each substrate was selectively etched. An antireflection coating was evaporated over each of the superlattice layers to eliminate Fabry-Perot interferences. The etalon showed a free carrier recovery time of 150 picoseconds with a $10^{13}/cm^2$ dose. Although the free carrier recovery speed was fast, a certain decrease was observed in the nonlinear refractive index response. When a dose of $10^{14}/cm^2$ was used, the free carrier recovery time was only 33 picoseconds. The nonlinear refractive index response has, however, almost vanished.

Review of such conventional semiconductor bistable etalons clearly indicates the necessity of reducing the free carrier recovery time without adversely affecting the nonlienear refractive index characteristic or response. Incidentally, it is understood that recombination centers of deep levels are introduced according to Silberberg et al by injection of the protons into the superlattice layer.

SUMMARY OF THE INVENTION

It is therefore an object of the present invention to provide a semiconductor bistable etalon which has a high switching speed.

It is another object of this invention to provide a semiconductor bistable etalon of the type described, which has a high switch-off speed.

It is still another object of this invention to provide a method of manufacturing a semiconductor bistable etalon of the type described.

Other objects of this invention will become clear as the description proceeds.

On describing the gist of a device according to this invention, it is possible to define that an optical bistable element comprises, between a pair of reflecting films operable as an etalon for an optical beam propagated between the reflecting films, a semiconductor layer having a refractive index variable with an intensity of the optical beam as a result of absorption by excitons.

According to an aspect of this invention, the semiconductor layer of the above-defined optical bistable element comprises a columnar portion for the optical beam and a surrounding portion surrounding the columnar portion and including atoms which reduce the refractive index in the surrounding portion relative to the refractive index in the columnar portion and serve as recombination centers for free carriers produced by decomposition of the excitons.

On describing the gist of a method according to this invention, it is possible to define that the method is for manufacturing an optical bistable element and includes the steps of (A) forming an etch-stop layer on a semiconductor substrate to provide a first principal surface between the etch-stop layer and the substrate, (B) forming a semiconductor layer on the etch-stop layer, which semiconductor layer has a second principal surface opposite to the etch-stop layer and a refractive index variable with an intensity of an optical beam passing therethrough as a result of absorption by excitons, (C) forming a window through the substrate to expose an exposed area of the first principal surface, and (D) forming a pair of reflecting films on the exposed area and the second principal surface, which reflecting films serve as an etalon for the optical beam.

According to another aspect of this invention, the above-defined method comprises, between the semiconductor layer forming step and the window forming step, the steps of (a) forming a mask selectively on the second principal surface to leave an uncovered area of the second principal surface and to define a columnar portion contiguous in the semiconductor layer to the mask and a surrounding portion surrounding contiguous to the uncovered area the columnar portion in the semiconductor layer, (b) injecting into the surrounding portion through the uncovered area atoms which reduce the refractive index in the surrounding portion relative to the refractive index in the columnar portion and serve as recombination centers for free carriers produced by decomposition of the excitons, and (c) removing the mask to wholly expose the second principal sufrace and to make the columnar portion operable as an optical guide for the optical beam.

DESCRIPTION OF THE PREFERRED EMBODIMENTS

Figure 1:
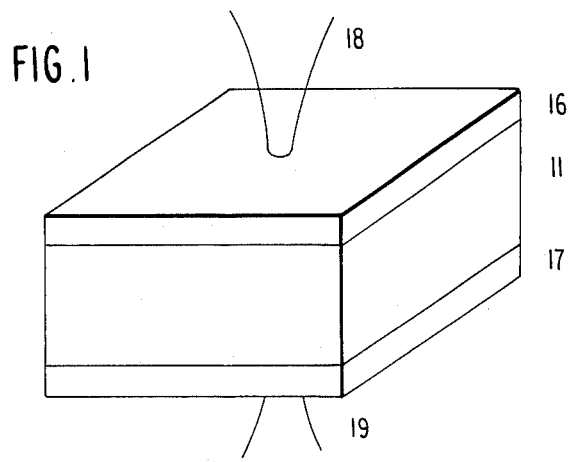
FIG. 1 is a schematic perspective view of a general semiconductor bistable etalon.

Referring to FIG. 1, a semiconductor bistable etalon will be described at first in general in order to facilitate an understanding of the present invention. In the manner described heretobefore, the semiconductor bistable etalon is an optical bistable element or device which comprises a semiconductor layer 11 having first and second principal surfaces and first and second dielectric coatings or films 16 and 17 on the respective principal surfaces. An optical beam of a variable input intensity or power is directed to the first dielectric coating 16 as an incident optical beam 18. As a propagated optical beam, the incident optical beam 18 passes through the semiconductor layer 11 and may come out of the etalon through the second dielectric coating 17 as an excit or transmitted optical beam 19 of an output intensity.

The dielectric coatings 16 and 17 are capable of reflecting the propagated optical beam to serve as the known partially silvered glass plates of a conventional etalon. The dielectric coatings 16 and 17 are therefore alternatively referred to as a pair of reflecting films.

The semiconductor layer 11 should be either a semiconductor superlattice layer of the type described hereinabove with reference to the Gibbs et al or the Silberberg et al letter or a single layer of bulk GaAs and has a refractive index which nonlinearly varies with the input intensity. More particularly, the semiconductor layer 11 should have a nonlinear refractive index characteristic or response to the incident optical beam 18 as a result of saturation by the input intensity of absorption of the propagated optical beam by excitons generated by the propagated optical beam. Reflecting the propagated optical beam, the dielectric coatings 16 and 17 carry out positive feedback on the nonlinear refractive index response in the manner which will presently be described. As a result, the excit optical beam 19 has an optical bistability relative to the incident optical beam 18 as will qualitatively be described in the following.

Figure 2:
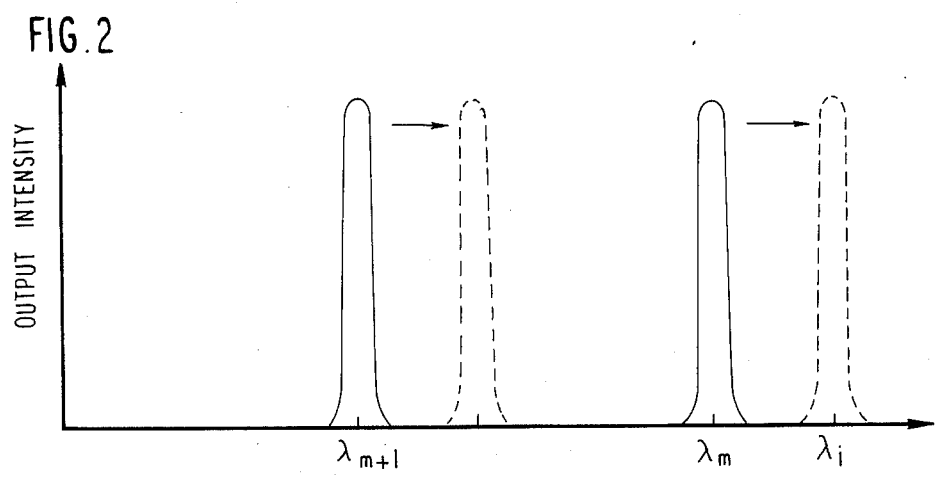
FIG. 2 shows a characteristic of a general semiconductor bistable etalon.

Turning to FIG. 2, the output intensity is plotted against various wavelengths of the incident optical beam 18 (FIG. 1). It will be assumed for a short while that the semiconductor layer 11 has a refractive index which has no dependency on the input intensity. In this event, the so-called semiconductor bistable etalon has a transmission characteristic of a Fabry-Perot resonator and is operable as a wavelength filter for the incident optical beam 18 rather than as an optical bistable element. Peak transmission occurs for the incident optical beam 18 when the wavelength satisfies the following relation:

$$\lambda_m = (2nL)/m, \tag{1}$$

where n represents the refractive index, L represents the thickness of the semiconductor layer 11, and m represents natural numbers. Such wavelengths will be termed peak transmission wavelengths of various orders m. Equation (1) shows that the peak transmission wavelengths do not vary for the incident optical beam 18 of various input intensities. It follows therefore that the excit optical beam 19 does not appear unless the incident optical beam 18 has an incident wavelength $\lambda_i$, which falls in areas enclosed with solid-line curves depicted for the respective peak transmission wavelengths, such as $\lambda_m$ and $\lambda_{m+1}$.

The fact is, however, that the refractive index is nonlinearly variable in the semiconductor bistable etalon with the input intensity. It will now be presumed that the refractive index n varies according to the following relation:

$$n = n_0 + n(J), \quad (2)$$

where $n_0$ represents the refractive index for the incident optical beam 18 of an infinitesimal intensity and $n(J)$ represents an additional refractive index which the semiconductor layer 11 has when the input intensity is equal to J. The additional refractive index and consequently the refractive index of the semiconductor layer 11 varies nearly linearly while the input intensity is appreciably weaker than a threshold intensity. When the input intensity approaches the threshold intensity, the additional refractive index grows great as a result of saturation of absorption by the excitons.

At any rate, it is clear from Equations (1) and (2) that the peak transmission wavelengths vary with the input intensity. More specifically, the peak transmission wavelengths move as indicated by arrows from positions depicted by the solid-line curves to positions illustrated by dashed-line curves. As a consequence, the incident optical beam 18 appears as the excit optical beam 19 of an appreciable output intensity as soon as the incident wavelength is covered by one of the solid-line curves for the respective peak transmission wavelengths.

Figure 3:
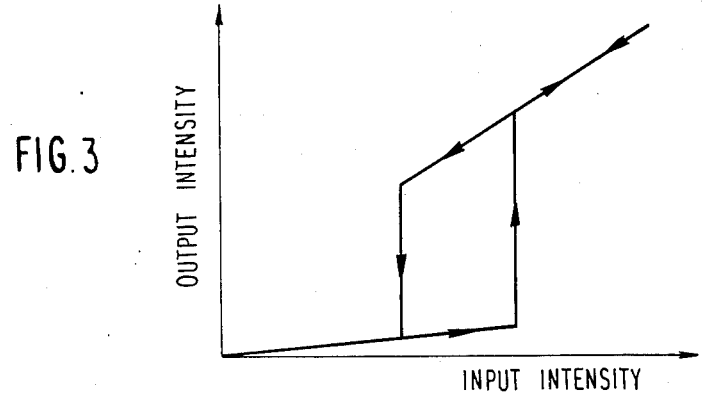
FIG. 3 schematically shows another characteristic of a general semiconductor etalon.

Further turning to FIG. 3, the output intensity is schematically depicted versus the input intensity. When the input intensity is zero, the output intensity is also zero. It will be assumed that the input intensity is continuously increased. In the manner described above in conjunction with FIG. 2, the output intensity appreciably increases when the input intensity increases to a first threshold value at which the solid-line curve for one of the peak transmission wavelength covers the incident wavelength. At this instant of time, the output intensity further increases as shown by a vertically ascending line as a result of the positive feedback which is carried out by the dielectric coatings 16 and 17 (FIG. 1) on the propagated optical beam to strengthen the propagated optical beam and therefore the nonlinear refractive index response. Further increase of the input intensity results in a substantially linear corresponding increase in the output intensity.

It will now be surmised that the input intensity is above the first threshold value and is gradually descreased. The output intensity correspondingly decreases and then suddenly decreases as illustrated by a vertically descending line when the input intensity is reduced to a second threshold value at which the solid-line curve under consideration leaves the incident wavelength. The second threshold value is weaker than the first threshold value. In this manner, an input intensity versus output intensity diagram has a hystereis loop.

Reviewing FIGS. 1 through 3, it is understood that a semiconductor bistable etalon is operable as an optical switching element and/or an optical memory element. According to the Gibbs et al letter referred to hereinabove, the semiconductor superlattice etalon is operable at room temperature with a low input power of only about one microwatt and has various other advantages in the manner pointed out heretobefore. Conventional semiconductor bistable etalons should, however, be improved as regards the switching speed without adverse effects on the nonlinear refractive index response in contrast to the teaching of the Silberberg et al letter. More specifically, the switch-off speed should be rendered nearly as fast as the switch-on speed.

Figure 4:
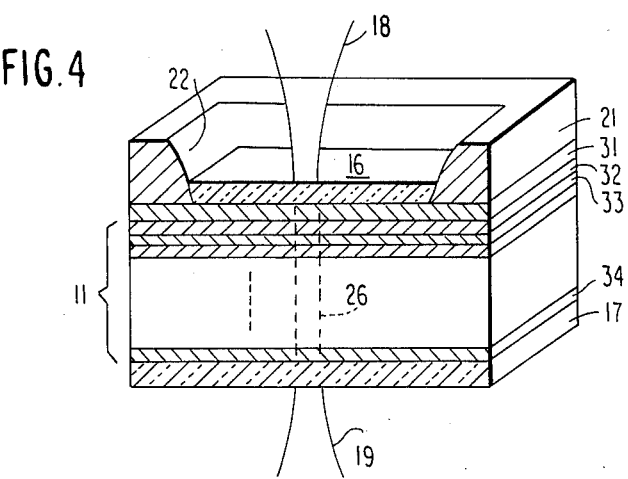
FIG. 4 shows, with a part cut away, a schematic perspective view of a semiconductor bistable etalon according to an embodiment of the instant invention.

Referring now to FIG. 4, description will proceed to a semiconductor bistable etalon according to a preferred embodiment of this invention. The semiconductor bistable etalon is a semiconductor superlattice etalon and comprises a GaAs-GaAlAs superlattice layer which has a first and a second principal surface and is designated by the reference numeral 11. In contact with the first and the second principal surfaces, respectively, first and second dielectric coatings or films are depicted at 16 and 17. An incident optical beam 18 of a variable input intensity or power is directed to the first dielectric coating 16. Propagated through the superlattice layer 11 as a guided optical beam, the incident optical beam 18 may come out of the second principal coating 17 as an excit or transmitted optical beam 19 of an output intensity.

The etalon comprises the superlattice layer 11 as a medium of a nonlinear refractive index as regards the input intensity and the first and the second dielectric coatings 16 and 17 as a pair of reflecting films of a conventional etalon for the guided optical beam. The semiconductor bistable etalon further comprises a GaAs substrate 21 contiguous to the first principal surface. The incident optical beam 18 falls on the first principal surface 16 through a window 22 having a window bottom on the first principal surface. More particularly, the substrate 21 is etched to provide the window 22 and to expose an exposed area of the first principal surface as the window bottom. The first dielectric coating 16 is formed on the exposed area.

The guided optical beam proceeds in the superlattice layer 11 through a columnar portion which serves as an optical guide 26 for the propagated optical beam in the manner which is described before and will be discussed immediately in the following. In the superlattice layer 11, the optical guiding portion 26 is surrounded by a cladding portion 27 which will best be illustrated shortly in the following.

In the example being illustrated, the optical guiding portion 26 has a circular cross-section and a diameter of about 5 microns. The optical guiding portion 26 may have a polygonal cross-section and a diameter between 1 micron and a few scores of microns, such as 50 microns. In marked contrast to the semiconductor superlattice etalon taught by Silberberg et al, hydrogen ions (protons) are injected only into the cladding portion 27 in the manner which will later be described more in detail. Injected, the hydrogen ions become hydrogen atoms which form deep levels in the superlattice layer 11 to provide recombination centers for free carriers of electron and hole pairs which are produced by decomposition of the excitons in response to the guided optical beam.

Figure 5:
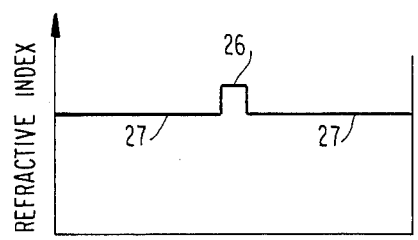
FIG. 5 schemitically shows a characteristic of the semiconductor bistable etalon depicted in FIG. 4.
Figure 6A:
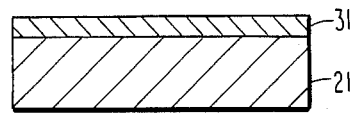
FIGS. 6(a) through (g) are schematic sectional views of a semiconductor bistable etalon, showing various steps of a method according to an embodiment of this invention.
Figure 6B:
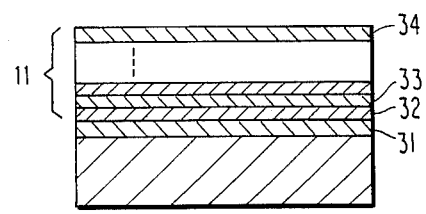
Figure 6C:
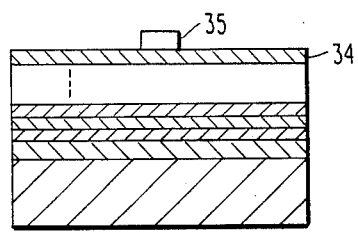
Figure 6D:
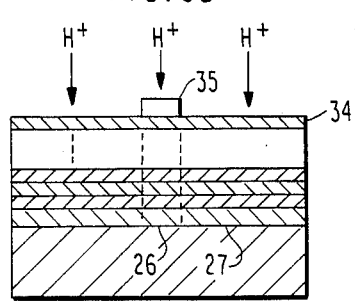
Figure 6E:
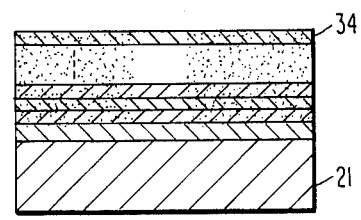
Figure 6F:
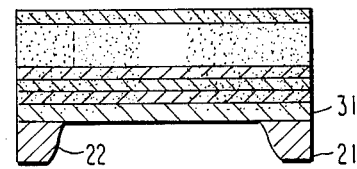
Figure 6G:
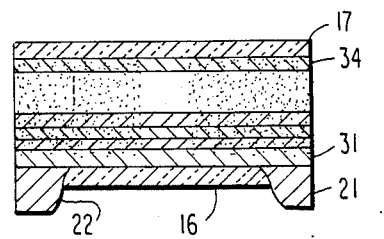

Turning to FIG. 5, the refractive index of the superlattice layer 11 (FIG. 4) is shown along a straight line which is orthogonal to the optical guiding portion 26 illustrated as a line segment designated by the reference numeral 26. The cladding portion 27 is depicted as two line segments which are on both sides of the line segment 26 and are indicated at 27. The hydrogen atoms are capable of reducing the refractive index in the cladding portion 27 relative to the refractive index which remains untouched in the optical guiding portion 26. The refractive index is therefore higher in the optical guiding portion 26 than in the cladding portion 27. The difference in the refractive index is about 1% of the refractive index of the optical guiding portion 26. This difference is sufficient to confine the propagated optical beam in the optical guide 26.

Referring next to FIGS. 6 (a) through (g), the description will proceed to a method according to another preferred embodiment of this invention. The method is for manufacturing a semiconductor superlattice etalon of the type illustrated with reference to FIG. 4. Similar parts are designated by like reference numerals. Molecular beam epitaxy (MBE) was used on forming various semiconductor layers on the substrate 21 of GaAs.

In the manner depicted in FIG. 6 (a), an etch-stop layer 31 of GaAlAs was formed on the substrate 21 to a thickness of about 1 micron or less. An interface between the etch-stop layer 31 and the substrate 21 serves as a first principal surface. The etch-stop layer 31 should be formed of GaAlAs of an aluminium content which is equal to or a little higher than that in GaAlAs used in forming the superlattice layer 11.

In FIG. 6 (b), a GaAs layer 32 was formed on the etch-stop layer 31 to a thickness of about 300 Å. A GaAlAs layer 33 was formed on the GaAs layer 32 to a thickness of about 400 Å. In this manner, about sixty periods of GaAs layer and GaAlAs layer pairs were successively formed on the etch-stop layer 31 as the superlattice layer 11. It should be noted that the first principal surface is not a surface of the superlattice layer 11 in the strict sense but is a surface or an interface which the etch-stop layer 31 has in contact with the substrate 21. One of the GaAs and the GaAlAs layers that is last formed to complete the superlattice layer 11, is preferably a GaAlAs layer that is indicated at 34 and has a second principal surface.

In FIG. 6 (c), a pattern 35 of a photoresist material was selectively formed by photolithography on the second principal surface to a thickness of about 5 microns. The photoresist material was what is usual in manufacture of semiconductor integrated circuits. The photoresist pattern 35 may be about 5 microns in diameter and may be either circular or polygonal in outline. The photoresist pattern 35 leaves an uncovered area of the second principal surface. In the manner which will presently become clear, the photoresist pattern 35 defines a columnar portion contiguous thereto in the superlattice layer 11. The columnar portion serves as the optical guiding portion 26. The uncovered area defines a cladding portion 27 which is contiguous to the uncovered area in the superlattice layer 11 and surrounds the columnar portion.

In FIG. 6 (d), hydrogen ions were injected only into the surrounding portion 27 through the uncovered area. More specifically, proton bombardment was carried out onto the photoresist pattern 35 and the uncovered area. The photoresist pattern 35 was used as a mask. Like the teaching of Silberberg et al, about 200-keV energy was given to the hydrogen ions. The 200-keV energy was selected in consideration of the thickness of the superlattice layer 11. The thickness of the photoresist pattern 35 was selected so that the hydrogen ions were not injected into the columnar portion. The dose was $10^{13}/cm^2$.

In FIG. 6 (e), the photoresist patter 35 (FIG. 6 (c) or (d)) was removed in the manner known in the art. An intermediate product thus manufactured, was annealed for about ten minutes at about 300° C. in the manner taught by Silberberg et al. Annealing was carried out in a known atmosphere of hydrogen. Another known atmosphere of nitrogen gave a similar intermediate product. The temperature was lowered from about 300° C. in the manner known in manufacture of semiconductor integrated circuits. The hydrogen ions got electrons in the cladding portion 27 and became hydrogen atoms, which are indicated by dots in the figure.

In FIG. 6 (f), the substrate 21 was mechanically polished down to a thickness of about 100 microns and was thereafter selectively etched until the etch-stop layer 31 became partly exposed as the afore-mentioned exposed area of the first principal surface. A known mixture of one part of ammonium and twenty parts of hydrogen peroxide was used as an etchant for the substrate 21. With this etchant, the exposed area was obtained in about ten minutes. The window 22 thus made, may have a diameter of several hundreds of microns. The window 22 may cover a plurality of columnar portions which are arranged in a two-dimensional array with a spacing of about 50 microns.

In FIG. 6 (g), the first and the second dielectric coatings 16 and 17 were vacuum evaporated onto the exposed area of the first principal surface and over the second principal surface. Manufacture of the semicondustor bistable etalon came to an end. Each dielectric coating 16 or 17 is preferably a known multilayer of silicon dioxide and titatium dioxide. It is possible to substitute a glass plate with such a multilayer for the second dielectric coating 17.

Reviewing FIGS. 4 through 6, the free carriers are produced in the optical guiding portion 26 in response to the propagated optical beam and diffuse into the cladding portion 27 while being produced. Inasmuch as the hydrogen atoms serve in the cladding portion 27 as recombination centers, the free carriers are subjected to rapid recombination. Moreover, the propagated optical beam is confined in the optical guide 26 by the difference in the refractive index and is not adversely affected by the hydrogen atoms which are present only in the cladding portion 27. In other words, the nonlinear refractive index response is not adversely affected at all by the hydrogen atoms in contrast to the semiconductor bistable etalon according to Silberberg et al. It has been confirmed that the dose of the hydrogen ions can be increased beyond $10^{14}/cm^2$ and that this high dose is preferable in attaining a high switch-off speed without an adverse effect on the nonlinear refractive index response.

To speak more in detail, the free carrier recovery time is equal to a sum of a diffusion time $T_{dif}$ of diffusion of the free carriers from the optical guiding portion 26 to the cladding portion 27 and a recombination time $T_{rec}$ in which the free carries recombine at the hydrogen atom recombination centers. The diffusion time $T_{dif}$ depends on the diameter of the optical guiding portion 26. When the optical guiding portion 26 has a diameter of several microns, the diffusion time is several hundreds of picoseconds long. When the optical guide 26 is one micron in diameter, the diffusion time is about 100 picoseconds long. On the other hand, the recombination time $T_{rec}$ depends on the density of the hydrogen atoms in the surrounding portion 27. Although the density is not yet quantatively measured, it is obvious that the density becomes high when the dose is high. For the dose of $10^{14}/cm^2$, it is already kown that the recombination time is only 10 picoseconds long or shorter. The free carrier recovery time is therefore from 100 picoseconds to several hundreds of picoseconds long and is much shorter than the free carrier recovery time which is as long as about 30 nanoseconds in conventional semiconductor bistable etalons if the nonlinear refractive index response should not be adversely affected.

In the manner described before, the energy relaxation time is only one picoseconds long or shorter. It is therefore possible with this invention to achieve, not only a high switch-off speed, but also a high switching speed. Furthermore, it is possible to use the cladding portion 27 in closely arranging a plurality of optical guide, such as 26. In other words, it is possible to easily isolate individual semiconductor bistable etalons in an integrated semiconductor bistable etalon. It has been confirmed that the semicondustor layer 11 may a bulk GaAs layer in the manner described in connection with FIG. 1 and may have a thickness of 2 to 3 microns. Incidentally, it is known that layer pairs are manufactured in a superlattice layer 11 with a pair of semiconductor materials having different band gaps.

While this invention has thus far been described in specific conjunction with a single embodiment of the device, a single embodiment of the method, and a few modifications of the embodiments, it will now readily be possible for one skilled in the art to carry this invention into effect in various other manners. For example, the constituent of the GaAlAs layers and the thicknesses of the GaAs and the GaAlAs layers in the superlattice layer 11 may be selected in consideration of the incident wavelength. The hydrogen ions may be injected as far into the etch-stop layer 31. The semiconductor layer 11 may be an InP-InGaAs superlattice layer. The semiconductor layer 11 may be manufactured by metal organic vapor phase epitaxy (MOVPE). It is possible to use ferrous ions or chromium ions in place of the hydrogen ions and to diffuse such ions instead of bombardment. In any event, the ions become the above-described atoms to behave as an impurity in the surrounding portion 27.

What is claimed is:

1. In an optical bistable element comprising, between a pair of reflecting films operable as an etalon for an optical beam propagated between said reflecting films, a semiconductor layer having a refractive index variable with an intensity of said optical beam as a result of absorption by excitons, the improvement wherein said semiconductor layer comprises a columnar portion for said optical beam and a surrounding portion surrounding said columnar portion and including atoms which reduce the refractive index in said surrounding portion relative to the refractive index in said columnar portion and serve as recombination centers for free carriers produced by decomposition of said excitons.

2. An optical bistable element as claimed in claim 1, said semiconductor layer being a semiconductor superlattice layer of two semiconductor materials having different band gaps, wherein said atoms are hydrogen atoms.

3. An optical bistable element as claimed in claim 1, said semiconductor layer being a single layer of a bulk semiconductor material, wherein said atoms are hydrogen atoms.

4. A method of manufacturing an optical bistable element including the steps of forming an etch-stop layer on a semiconductor substrate to provide a first principal surface between said etch-stop layer and said substrate, forming a semiconductor layer on said etch-stop layer, said semiconductor layer having a second principal surface opposite to said etch-stop layer and a refractive index variable with an intensity of an optical beam passing therethrough as a result of absorption by excitons, forming a window through said substrate to expose an exposed area of said first principal surface, and forming a pair of reflecting films on said exposed area and said second principal surface, said reflecting films serving as an etalon for said optical beam, wherein the improvement comprises, between said semiconductor layer forming step and said window forming step, the steps of:

forming a mask selectively on said second principal surface to leave an uncovered area of said second principal surface and to define a columnar portion contiguous in said semiconductor layer to said mask and a surrounding portion surrounding contiguous to said uncovered area said columnar portion in said semiconductor layer;

injecting into said surrounding portion through said uncovered area atoms which reduce the refractive index in said surrounding portion relative to the refractive index in said columnar portion and serve as recombination centers for free carriers produced by decomposition of said excitons; and removing said mask to wholly expose said second principal surface and to make said columnar portion operable as an optical guide for said optical beam.

5. A method as claimed in claim 4, said semiconductor layer forming step comprising the steps of successively forming semiconductor layer pairs on said etch-stop layer with each semiconductor layer pair formed of a pair of semiconductor materials having different band gaps, wherein said injecting step comprises the step of bombarding said mask and said uncovered area by hydrogen ions.

6. A method as claimed in claim 4, said semiconductor layer being a single layer of a bulk semiconductor material, wherein said injecting step comprises the step of bombarding said mask and said uncovered area by hydrogen ions.

* * * * *